US 8,634,704 B2

(12) United States Patent
Johnston et al.

(10) Patent No.: US 8,634,704 B2
(45) Date of Patent: Jan. 21, 2014

(54) APPARATUS AND METHOD FOR STORING AND PROVIDING A PORTION OF MEDIA CONTENT TO A COMMUNICATION DEVICE

(75) Inventors: Robert Johnston, Atlanta, GA (US); Frank Coppa, North Kansas City, MO (US); James Wood, Clermont, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 506 days.

(21) Appl. No.: 12/560,869

(22) Filed: Sep. 16, 2009

(65) Prior Publication Data

US 2011/0067058 A1    Mar. 17, 2011

(51) Int. Cl.
| H04N 5/91 | (2006.01) |
| H04N 7/16 | (2011.01) |
| H04N 5/445 | (2011.01) |
| G06F 13/00 | (2006.01) |
| G06F 3/00 | (2006.01) |

(52) U.S. Cl.
USPC ............. 386/263; 725/25; 725/58; 725/62

(58) Field of Classification Search
None
See application file for complete search history.

(56) References Cited

U.S. PATENT DOCUMENTS

| 2002/0069218 | A1* | 6/2002 | Sull et al. ................... 707/501.1 |
| 2003/0121055 | A1* | 6/2003 | Kaminski et al. ............. 725/115 |
| 2005/0165849 | A1* | 7/2005 | Moradi et al. ............. 707/104.1 |
| 2006/0129688 | A1* | 6/2006 | Chatani et al. ................ 709/229 |
| 2007/0250900 | A1* | 10/2007 | Marcuvitz ..................... 725/141 |
| 2008/0141064 | A1* | 6/2008 | Reich et al. ....................... 714/2 |
| 2009/0049482 | A1* | 2/2009 | Auerbach et al. ............... 725/58 |
| 2009/0187670 | A1* | 7/2009 | Lee .............................. 709/231 |
| 2009/0228569 | A1* | 9/2009 | Kalmanje et al. ............. 709/217 |

* cited by examiner

*Primary Examiner* — Thai Tran
*Assistant Examiner* — Sunghyoun Park
(74) *Attorney, Agent, or Firm* — Guntin & Gust, PLC; Jay H. Anderson (57) ABSTRACT

A system that incorporates teachings of the present disclosure may include, for example, a mobile device having a controller to present media content provided by an interactive television (iTV) network, select a function during presentation of the media content to store at least a remaining portion of the media content, wherein the function is selected when the presentation of the media content is to be interrupted, store the media content in a memory location of the mobile device, select the function to retrieve the remaining portion of the media content from the memory location, and present the remaining portion of the media content. Other embodiments are disclosed.

20 Claims, 6 Drawing Sheets

APPARATUS AND METHOD FOR STORING AND PROVIDING A PORTION OF MEDIA CONTENT TO A COMMUNICATION DEVICE

FIELD OF THE DISCLOSURE

The present disclosure relates generally to providing media content and more specifically to an apparatus and method for providing content to a media device.

BACKGROUND

The Internet and other networks provide users with a means for experiencing and sharing various types of media content. The media content can often include audio content, video content, text content, still image content, and/or combinations thereof. Other media content providing sources can include Internet Protocol Television (IPTV), cable TV, and satellite TV. Users of these and other media content sources can search these sources for desired content. Often times, however, users are unable to view content, such as scheduled television programming, during the time the content is scheduled to be broadcasted to the user's media devices. As a result, such users can utilize Digital Video Recording or other similar technologies to record the missed content so that the users can view and experience the content at their leisure.

DETAILED DESCRIPTION

One embodiment of the present disclosure can entail a mobile device having a controller to present media content provided by an interactive television (iTV) network, select a function during presentation of the media content to store at least a remaining portion of the media content, wherein the function is selected when the presentation of the media content is to be interrupted, store the media content in a memory location of the mobile device, select the function to retrieve the remaining portion of the media content from the memory location, and present the remaining portion of the media content.

Another embodiment of the present disclosure can entail a method including transmitting media content generated by an iTV network to a mobile device, wherein the media content is presented by the mobile device, receiving a request to store a remaining portion of the media content from the mobile device when presentation of the media content is interrupted, storing the remaining portion of the media content based on at least one of electronic guide information and a run time of the media content, receiving a request to access the remaining portion of the media content from the mobile device, and transmitting the remaining portion of the media content to the mobile device.

Yet another embodiment of the present disclosure can entail a computer-readable storage medium, comprising computer instructions to present media content provided by an iTV network, select a function during presentation of the media content to transmit a request to a gateway to store at least a portion of the media content, wherein the portion of the media content is stored by the gateway, select the function to retrieve the stored portion of the media content from the gateway, and present the retrieved portion of the media content.

Figure 1:
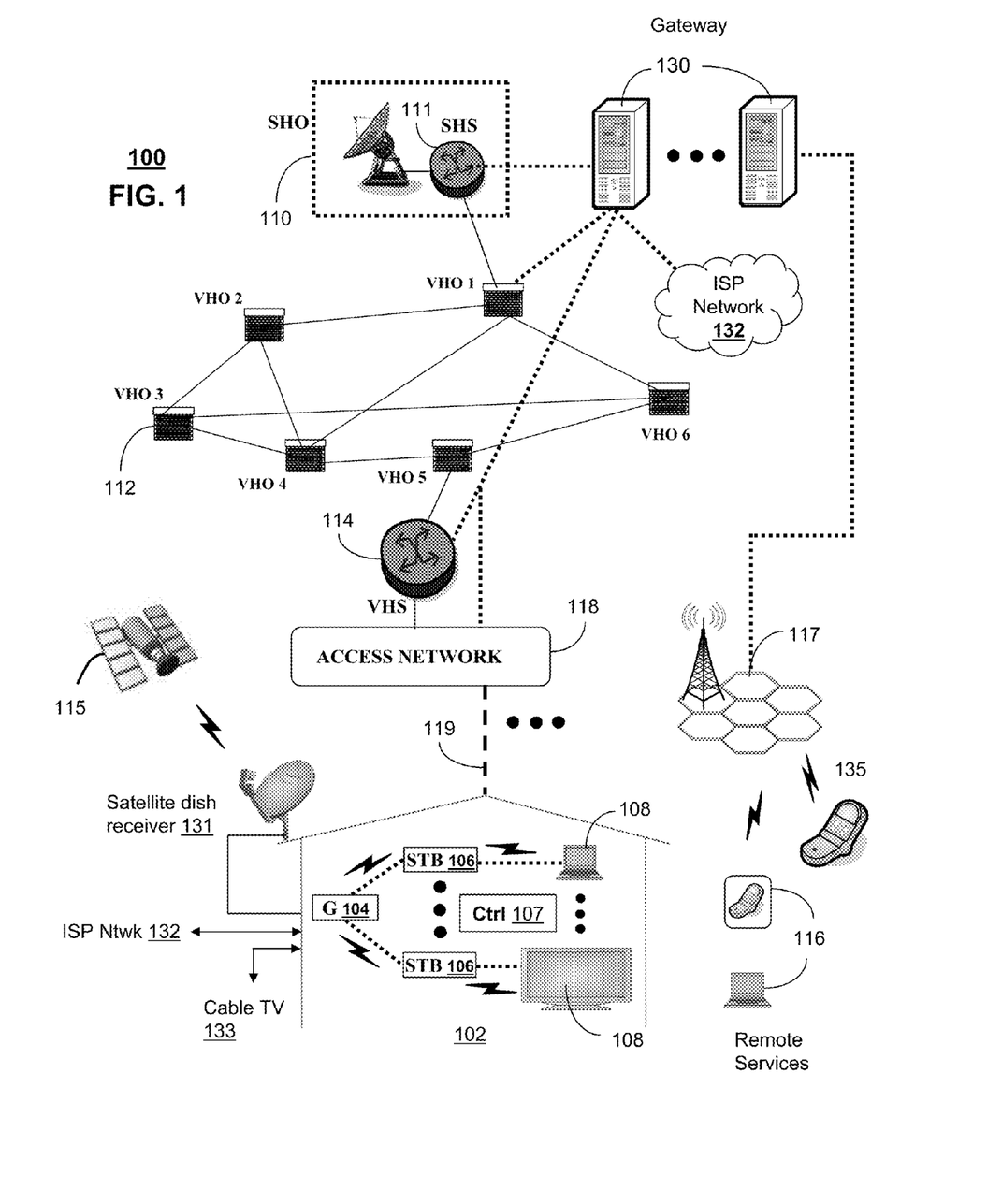
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Wireless communications device 116 can be a mobile/cellular phone, a personal digital assistant (PDA), or other mobile device capable of communicatively linking to a cellular or other similar network. The first communication system 100 can also include a mobile device 135. Much like communications device 116, the mobile device 135 can be a mobile/cellular phone, personal digital assistant, smart phone, personal computer, or other similar device. The mobile device 135 can be configured to communicatively link to base station 117 and access networks in the system 100. Notably, mobile device 135 can be further configured to contain a software client/application, which can be utilized to store media content in a similar fashion to that of a Digital Video Recorder (DVR).

Another distinct portion of the computing devices 130 can function as a gateway (herein referred to as gateway 130). The gateway 130 can use common computing and communication technology to perform the function of providing media content and/or other types content to the devices in the system 100, such as wireless device 116 and mobile device 135. The gateway 130 can distribute media content such as video, audio, text, image, and other content to the various devices. Additionally, the gateway 130 can be configured to store media content provided by an iTV network or other similar network. The gateway 130 can function like a DVR and can be configured to store scheduled or other content, which can then be accessed by devices such as wireless device 116 for future use.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
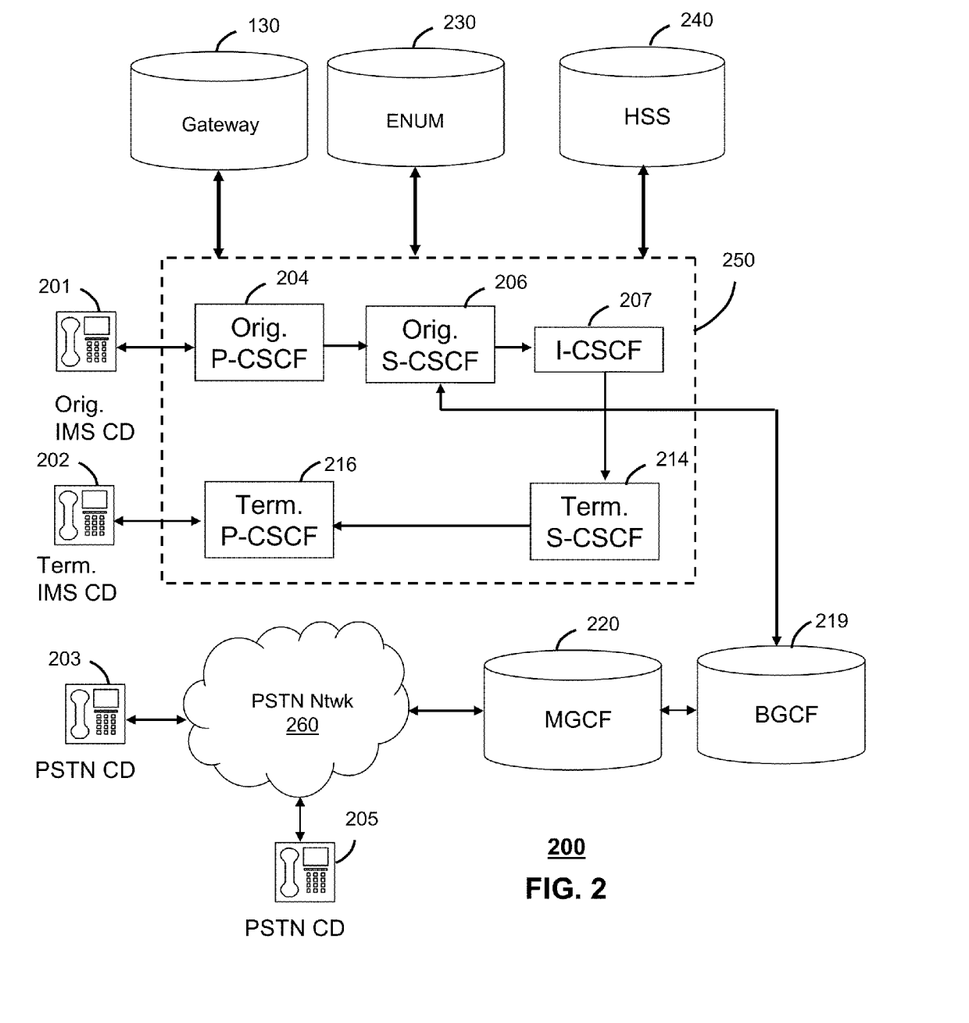

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The gateway 130 of FIG. 1 can be operably coupled to the second communication system 200 for purposes similar to those described above.

Figure 3:
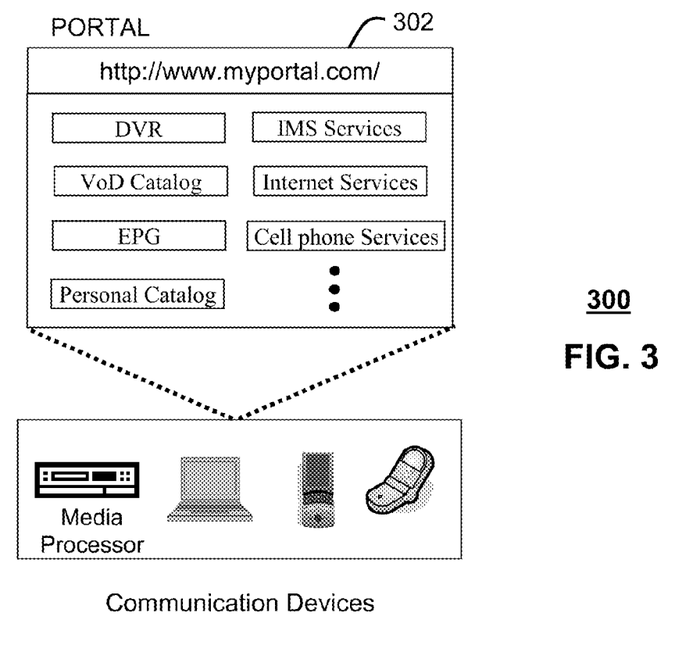
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a DVR, a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
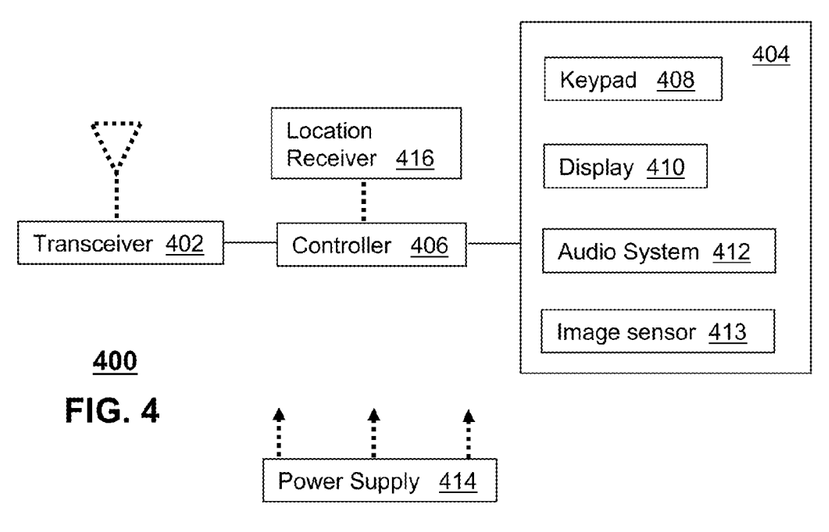
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
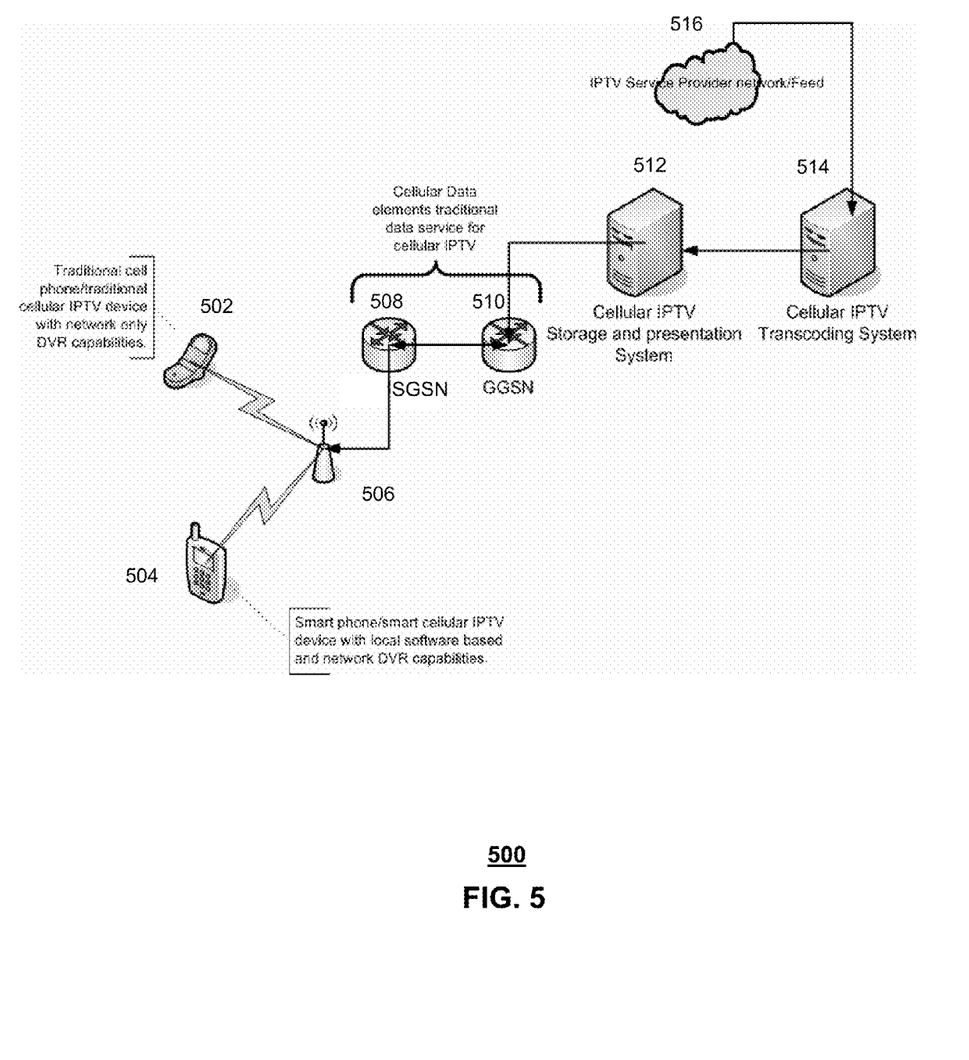
FIG. 5 depicts an illustrative embodiment of a system for providing content to a media device, the system operating in portions of the communication systems of FIGS. 1-2

FIG. 5 depicts an illustrative embodiment of a system 500 for providing secure transmission of media content, the system 500 being operable in portions of the communications systems of FIGS. 1-2. The system 500 can include communications devices 502 and 504, a base station 506, a Serving GPRS Support Node (SGSN) 508, a Gateway GPRS Support Node (GGSN) 510, a cellular IPTV storage and presentation system 512, a cellular IPTV transcoding system 514, and an iTV service provider network such as IPTV service provider network 516. The communications device 502 can correlate with wireless device 116 from FIG. 1 and can be a mobile phone, PDA, or other device capable of communicatively linking to a cellular or other similar network. Communications device 504 can correlate with mobile device 135 and can also be a mobile phone, PDA, or other similar device. However, communications device 504 can further include software configured to store media content or other content on the communications device 504, much like that of a DVR. The media content can be stored in local memory and can be utilized when a user of the communications device 504 requests the media content.

Notably, the iTV service provider network can be configured to deliver media content such as video, audio, text, images, and other types of media content to the cellular IPTV transcoding system 514. The IPTV transcoding system 514 can transform/transcode the media content provided by the service provider network 516 into a format that is recognizable and accessible by the communications devices 502 and 504. Once the media content is transcoded by the cellular IPTV transcoding system 514, the content can be delivered to the storage and presentation system 512. The storage and presentation system 512 can be configured to store the content and prepare the content for presentation on communications devices 502 and 504.

The storage and presentation system 512 and/or other devices in the system 500 can deliver the media content to the GGSN 510, which can serve as an interface between the IPTV service provider network 516 and the other devices in the system 500. The GGSN 510 can also be configured to maintain the necessary routing information to tunnel/deliver the content to the SGSN 508. Once, the GGSN 510 delivers the media content to the SGSN 508, the SGSN 508 can be configured to deliver the content to base station 506, which can then relay the media content to communications devices 502 and 504. The communications devices 502 and 504 can then present the media content.

If a user of communications device 502 needs to view or experience a remaining portion of the media content at a later time, the user can select a function on the communications device 502 to transmit a request to store a portion of the remaining media content to a service gateway, such as SGSN 508. The SGSN 508 can be configured to store the remaining portion and can be configured to transmit the remaining portion to the communications device 502 when the user selects the function again. If a user of communications device 504 needs to view or experience a remaining portion of the media content at another time, the user can select a function on communications device 504 to store a portion of the remaining media content at a memory location of the communications device 504 itself. When the user decides to view the remaining portion, the user can select the function again to retrieve the remaining portion from the memory location.

Figure 6:
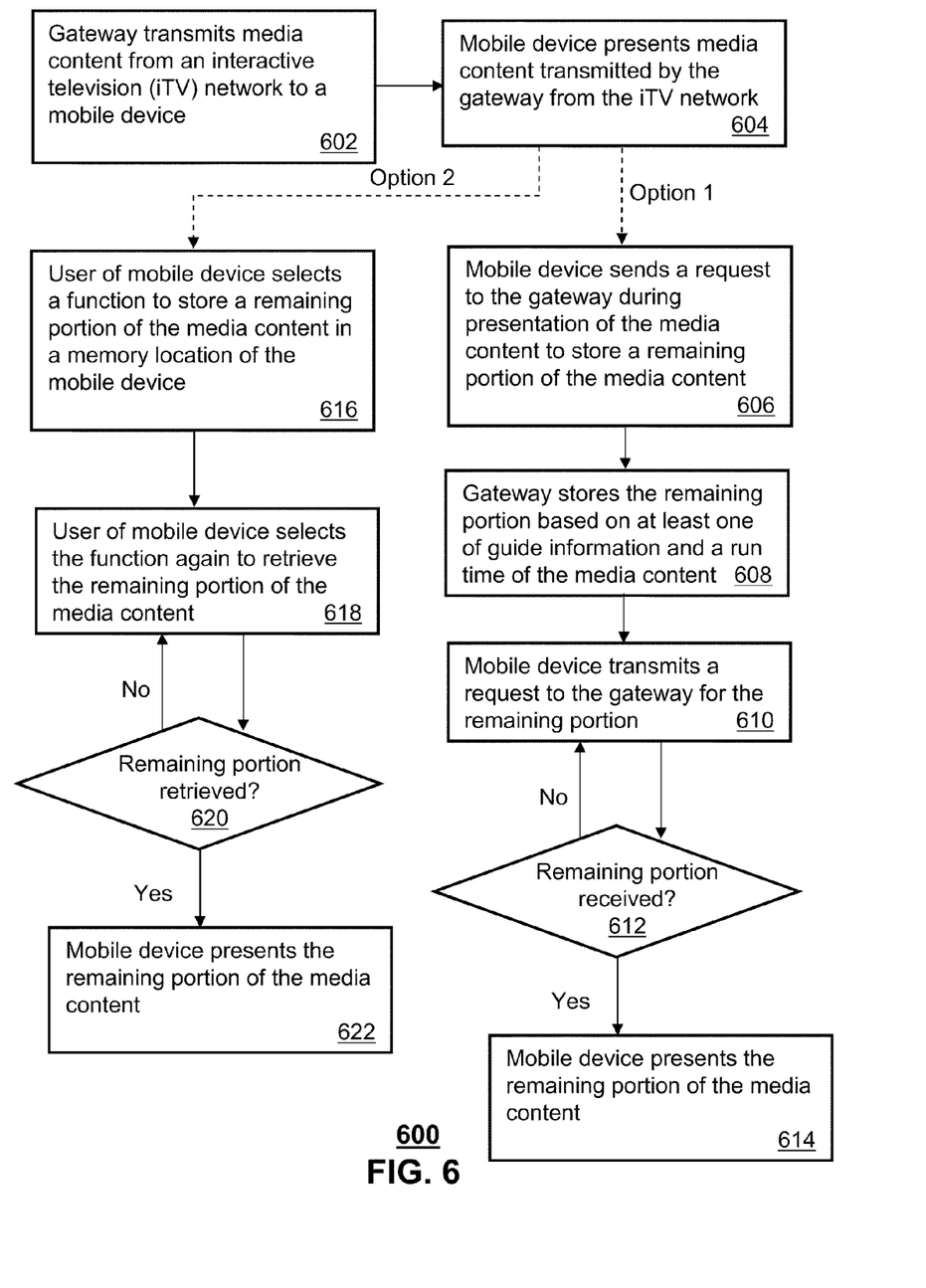
FIG. 6 depicts an illustrative embodiment of a method operating in portions of the communication systems of FIGS. 1-2.

FIG. 6 depicts an illustrative method 600 for providing content to a media device that operates in portions of the communication system of FIGS. 1-2 and FIG. 5. Method 600 can begin with step 602 in which a service gateway or similar computing device in an iTV network or similar network transmits media content to a mobile device, such as either one or both of communications devices 502 and 504. At step 604, the mobile device can be configured to present the media content received from the gateway. If communications device 502 is the device that receives the media content, the method 600 proceeds under option 1 of FIG. 6. On the other hand, if communications device 504 is the device that receives the media content, the method 600 can proceed under option 2 of FIG. 6.

Under option 1, communications device 502 can be configured to transmit a request to the gateway (such as SGSN 508 or another service gateway) during presentation of the media content to store a remaining portion of the media content at step 606. Such a situation can arise when a user of the communications device 502 needs to view the remaining portion of the media content at a later time or encounters an error during presentation of the media content. Of course, other scenarios are contemplated under the method 600 and the invention is not to be limited to the above the scenarios. The user can send the request by pressing a button the communications device 502, by selecting a function of an application on a touch screen, or through other means.

At step 608, the gateway can store the remaining portion of the media content. Notably, the gateway can store the remaining portion based on at least one of guide information or a run time of the media content. For example, an electronic program guide can be accessed by the gateway and the gateway can use the information in determining the portion of media content to store. Similarly, if a user had to stop watching a movie one hour into a two hour movie, the gateway can be configured to store the remaining hour of the movie. When the user wants to watching or experience the remaining portion of the media content, the user can select a function to send a request to the gateway for the remaining portion at step 610.

The gateway can transmit the remaining portion to the communications device 502. The communications device 502 can determine if the remaining portion is received at step 612. If the remaining portion is not received by the communications device 502, the user can repeat step 610. If the remaining is received by the communications device 502, the communications device 502 can present the remaining portion of the media content at step 614. For example, if the last one hour of a movie was the remaining portion, the communications device 502 can display the remaining portion for the user.

Under option 2, the user of communications device 504 can select a function in an application on the communications device 504 to store a remaining portion of the media content in a memory location of the communications device 504 at step 616. Once the function is selected, the communications device 504 can store the remaining content for future use. When the user wants to view the remaining portion of the media content, the user can select the function again or a separate function to retrieve the remaining portion of the media content at step 618. At step 620, the communications device 504 can determine if the remaining portion was effectively retrieved. If the remaining portion was not retrieved, the user can repeat step 618 or the communications device 504 can automatically make another attempt at retrieving the media content. If the remaining portion was effectively retrieved, the communications device 504 can present the remaining portion of the media content for the user at step 622.

In an embodiment, the communications device 504 can be configured to only store the remaining portion of the media content when the communications device 504 is communicatively linked to a cellular network and/or an iTV service provider network such as IPTV service provider network 516. For example, if a user is watching a media program on his phone, but then has to attend a meeting, the user can silence his phone and select a function on an application on the phone to store the remaining portion of the media program while the phone is connected to IPTV service provider network 516. In another embodiment, either communications device 502 or 504 can be configured to send a request to store the remaining portion of the media content via an EPG. In still another embodiment, the gateway and/or other devices communicatively linked to the iTV service provider network can secure the media content using digital rights management (DRM) technology.

Upon reviewing the aforementioned embodiments, it would be evident to an artisan with ordinary skill in the art that said embodiments can be modified, reduced, or enhanced without departing from the scope and spirit of the claims described below. For example, in an embodiment according the invention, if the presentation of the media content on communications devices 502 or 504 is interrupted by an error, the communications devices 502 or 504 and/or other devices in the system 500 can be configured to correct the error by selecting the appropriate function on the application on the communications devices 502 and 504. In another embodiment, the communications devices 502 and 504 can be configured to receive an advertisement from the gateway or other device in the system 500. Notably, the advertisement can be associated with the media content being presented at the communications device. For example, if communications device 504 is playing a movie about racing, an advertisement about racing tires can pop up on the communications device 504.

In one embodiment, the gateway and/or other devices in the system 500 can be configured to store entire media programs prior to transmitting the programs to the communications device 502. In doing so, the communications device 502 would not have to transmit a request to store the content as the content will already be stored. In fact, when the user of communications device 502 wants to view a remaining portion of the media content, he can select a function to retrieve the remaining portion since it was stored prior to being transmitted to the communications device 502. In yet another embodiment, the user can select a function to specify one or more other devices to receive the remaining portion of the media content. For example, the user can select a STB, personal computer, or other device capable of receiving iTV content or similar content to receive the remaining portion of the content. This way the user does not have to view the remaining portion on his mobile phone, but instead can view the remaining portion on his television set or on his personal computer.

Other suitable modifications can be applied to the present disclosure without departing from the scope of the claims below. Accordingly, the reader is directed to the claims section for a fuller understanding of the breadth and scope of the present disclosure.

Figure 7:
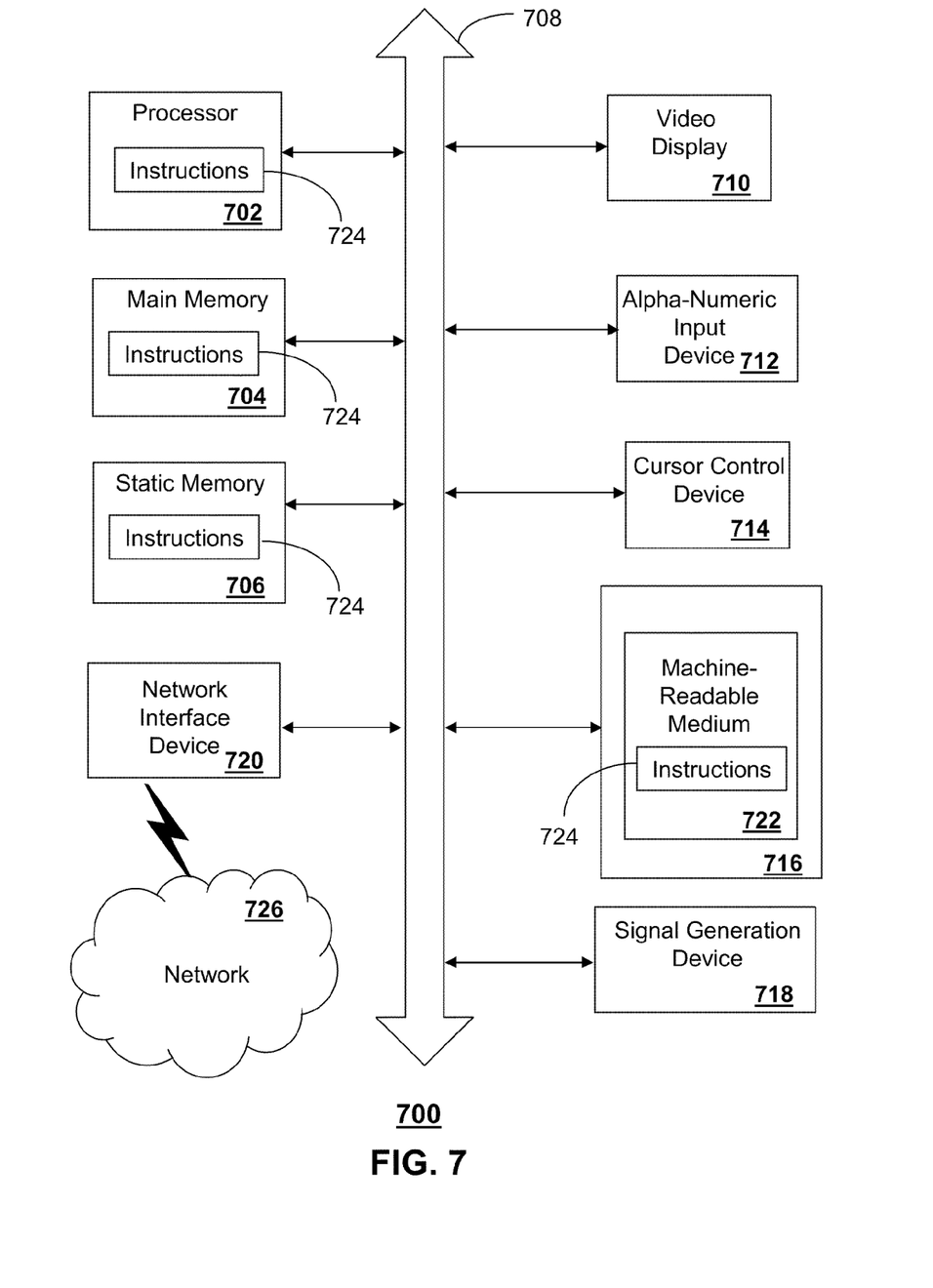
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
   a memory to store computer instructions; and a controller coupled with the memory, wherein the controller, responsive to executing the computer instructions, performs operations comprising:

presenting media content transmitted by a gateway in communication with an interactive television network, the media content provide by a server of the interactive television network;

detecting an error in the presenting of the media content;

generating a storage request for storing a remaining portion of the media content at the gateway responsive to the detecting of the error, wherein the storage request is generated without user input at the mobile device, wherein the remaining portion of the media content comprises content that has not been presented by the mobile device;

providing the storage request to the gateway to cause the gateway to access an electronic media guide for identifying the remaining portion of the media content and to cause the gateway to obtain and store the remaining portion of the media content at the gateway without obtaining and storing an entire copy of the media content at the gateway, wherein the gateway obtains the remaining portion of the media content from a network storage device that is remote from the gateway, and wherein the identifying of the remaining portion of the media content is based on guide information of the electronic media guide that corresponds to the media content and a run time of the media content;

subsequently generating a retrieval request for retrieving the remaining portion of the media content from the gateway, wherein the retrieval request is generated based on user input at the mobile device; and     providing the retrieval request to the gateway to cause the gateway to transmit the remaining portion of the media content for presentation at the mobile device.

2. The mobile device of claim 1, wherein the controller, responsive to executing the computer instructions, performs operations comprising:

storing a copy of the remaining portion of the media content at the memory of the mobile device, wherein the controller stores the copy of the remaining portion of the media content only when the mobile device is communicatively linked to a cellular data network.

3. The mobile device of claim 1, wherein the controller, responsive to executing the computer instructions, performs operations comprising:

receiving the remaining portion of the media content; and     presenting the remaining portion of the media content at a display device of the mobile device, wherein the media content includes video and audio content.

4. The mobile device of claim 3, wherein the controller receives other media content from the interactive television network, wherein the other media content is associated with the media content based on a subject matter of the media content.

5. The mobile device of claim 1, wherein the interactive television network comprises an internet protocol television system, and wherein the gateway is a serving general packet radio service support node.

6. The mobile device of claim 1, wherein the storage request enables the gateway to transmit the remaining portion of the media content to a second communication device responsive to receiving a second retrieval request from the second communication device.

7. The mobile device of claim 6, wherein the second communication device is selected based on user input at the mobile device.

8. The mobile device of claim 1, wherein the media content is secured by digital rights management by a computing device in communication with the interactive television network.

9. The mobile device of claim 1, wherein the controller receives an advertisement from the interactive television network, wherein the advertisement is associated with the media content.

10. A method, comprising:

transmitting, by a system comprising a gateway, media content generated by an interactive television network to a mobile device via the gateway, wherein the transmitting of the media content causes presentation of the media content at the mobile device;

receiving, by the gateway, a storage request to store a remaining portion of the media content from the mobile device when presentation of the media content is interrupted, wherein the storage request is received at the gateway responsive to a detection of an error in the presentation of the media content at the mobile device, wherein the receiving of the storage request is without user interaction, wherein the remaining portion of the media content comprises content that has not been presented by the mobile device;

identifying, by the gateway, the remaining portion of the media content based on electronic guide information and a run time of the media content, the identifying of the remaining portion being responsive to the receiving of the storage request;

obtaining and storing, by the gateway, the remaining portion of the media content at the gateway without obtaining and storing an entire copy of the media content at the gateway;

subsequently receiving, by the gateway, a retrieval request to access the remaining portion of the media content from the mobile device; and     subsequently transmitting, by the gateway, the remaining portion of the media content to the mobile device.

11. The method of claim 10, wherein the interactive television network comprises an internet protocol television system.

12. The method of claim 10, comprising generating corrected media content by correcting an error in the media content occurring during presentation of the media content, and transmitting the corrected media content to the mobile device.

13. The method of claim 10, comprising receiving a request to access the remaining portion of the media content from a set top box, wherein the set top box is associated with the mobile device.

14. The method of claim 13, comprising transmitting the remaining portion of the media content from the gateway to the set top box without transmitting an entire copy of the media content, and wherein the detection of the error is by a device other than the mobile device.

15. The method of claim 10, comprising securing the media content via digital rights management protocol utilizing a computing device other than the gateway and the mobile device.

16. A tangible computer-readable storage device, storing computer instructions which, responsive to being executed by a processor, cause the processor to perform operations comprising:

presenting media content at a display device, the media content provided by an interactive television network and transmitted to the display device via a gateway in communication with the interactive television network;

detecting an error in the presenting of the media content;
responsive to the detecting of the error and without user interaction, transmitting a storage request to the gateway that causes the gateway to obtain a remaining portion of the media content based on electronic programming guide information and causes the gateway to store the remaining portion of the media content without obtaining and storing an entire copy of the media content at the gateway wherein the remaining portion of the media content comprises content that has not been presented at the display device;
subsequently generating a retrieval request for retrieving the remaining portion of the media content from the gateway, wherein the retrieval request is generated based on user input at a mobile device; and
subsequently presenting the remaining portion of the media content at the display device.

17. The tangible computer-readable storage device of claim 16, comprising computer instructions to specify a set top box to access the remaining portion of the media content from the gateway.

18. The tangible computer-readable storage device of claim 17, wherein the set top box presents the remaining portion of the media content at the display device.

19. The tangible computer-readable storage device of claim 16, wherein the gateway stores the remaining portion of the media content based on a run time of the media content.

20. The tangible computer-readable storage device of claim 16, wherein the gateway secures the media content via a digital rights management protocol.

* * * * *